United States Patent
Han et al.

(10) Patent No.: US 11,432,177 B2
(45) Date of Patent: Aug. 30, 2022

(54) METHOD AND DEVICE OF MEASUREMENT REPORT ENHANCEMENT FOR AERIAL UE

(71) Applicant: Lenovo (Beijing) Limited, Beijing (CN)

(72) Inventors: Jing Han, Beijing (CN); Lianhai Wu, Beijing (CN); Haiming Wang, Beijing (CN); Zhuoyun Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 3 days.

(21) Appl. No.: 16/646,500

(22) PCT Filed: Sep. 28, 2017

(86) PCT No.: PCT/CN2017/103927
§ 371 (c)(1),
(2) Date: Mar. 11, 2020

(87) PCT Pub. No.: WO2019/061138
PCT Pub. Date: Apr. 4, 2019

(65) Prior Publication Data
US 2020/0260307 A1   Aug. 13, 2020

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04B 17/336* (2015.01); *H04W 28/0835* (2020.05)

(58) Field of Classification Search
CPC ............. H04W 24/10; H04W 36/0058; H04W 36/00837; H04W 36/0085; H04W 36/30;
(Continued)

(56) References Cited

U.S. PATENT DOCUMENTS

2007/0287510 A1* 12/2007 Nader ................... H04W 24/10
455/574
2008/0004023 A1* 1/2008 Chen ................. H04W 52/0229
455/434
(Continued)

FOREIGN PATENT DOCUMENTS

CN     105072643 A    11/2015
EP       3122104 A1    1/2017
(Continued)

OTHER PUBLICATIONS

PCT/CN2017/103927, "International Search Report and the Written Opinion of the International Searching Authority", ISA/CN, State Intellectual Property Office of the P.R. China, May 23, 2018, pp. 1-6.

(Continued)

*Primary Examiner* — Daniel Lai
(74) *Attorney, Agent, or Firm* — Kunzler Bean & Adamson

(57) ABSTRACT

A method of measurement report enhancement for aerial UE. A method of measurement report enhancement, the method comprising: receiving a measurement report configuration with a new measurement triggering condition and corresponding threshold from eNB; performing measurements of a cells according to the new measurement triggering condition; evaluating if a new triggering condition is satisfied according to the threshold based on the measurement result of cells; and reporting the measurement report to the eNB when the new triggering condition is satisfied.

16 Claims, 6 Drawing Sheets

(51) Int. Cl.
*H04B 17/336* (2015.01)
*H04W 28/08* (2009.01)

(58) Field of Classification Search
CPC ..... H04W 88/02; H04W 24/02; H04W 28/06; H04W 36/0088; H04W 36/0094; H04W 36/36; H04W 4/38; H04W 74/006; H04W 24/04; H04W 40/24; H04W 4/00; H04W 4/021; H04W 4/40; H04W 28/0835; H04B 17/309; H04B 17/318; H04B 17/336; H04B 17/101; H04B 17/10; H04B 17/102; H04B 17/24; H04B 17/327; H04B 17/382; H04L 1/0026; H04L 41/0803; H04L 12/16

See application file for complete search history.

(56) References Cited

U.S. PATENT DOCUMENTS

| | | | |
|---|---|---|---|
| 2010/0197300 A1* | 8/2010 | Van Der Velde | H04W 36/0088 455/425 |
| 2012/0244903 A1* | 9/2012 | Fong | H04W 8/20 455/517 |
| 2013/0242787 A1 | 9/2013 | Sun et al. | |
| 2014/0241180 A1* | 8/2014 | Amerga | H04W 36/0007 370/252 |
| 2015/0038151 A1* | 2/2015 | Dalsgaard | H04W 36/00837 455/444 |
| 2015/0358477 A1* | 12/2015 | Jeong | H04W 40/24 370/259 |
| 2016/0007350 A1* | 1/2016 | Xiong | H04W 24/10 370/252 |
| 2016/0212645 A1* | 7/2016 | Uemura | H04W 24/08 |
| 2018/0213427 A1* | 7/2018 | Uemura | H04W 24/10 |
| 2018/0324667 A1* | 11/2018 | Dong | H04W 4/90 |
| 2019/0074916 A1* | 3/2019 | Zhang | H04B 17/318 |
| 2019/0180633 A1* | 6/2019 | Yoshizawa | H04W 24/10 |
| 2020/0145864 A1* | 5/2020 | Liu | H04W 36/30 |
| 2020/0236573 A1* | 7/2020 | Zhang | B64C 39/024 |

FOREIGN PATENT DOCUMENTS

| | | |
|---|---|---|
| WO | 2014121476 A1 | 8/2014 |
| WO | 2015113597 A1 | 8/2015 |
| WO | 2016087899 A1 | 6/2016 |

OTHER PUBLICATIONS

PCT/CN2017/103927, "European Search Report", ISA/CN, State Intellectual Property Office of the P.R. China, Mar. 26, 2018, pp. 1-13.

3GPP, 3rd Generation Partnership Project; Technical Specification Group Radio Access Network; Measurements Reporting Enhancements for UAV UE, 3GPP R2-1709396, August 201, pp. 1-9.

3GPP, 3rd Generation Partnership Project; Technical Specification Group Radio Access Network; UL Interference from an aerial vehicle, 3GPP R2-1709038, Aug. 2017, pp. 1-2.

* cited by examiner

METHOD AND DEVICE OF MEASUREMENT REPORT ENHANCEMENT FOR AERIAL UE

FIELD

The subject matter disclosed herein generally relates to wireless communications and more particularly relates to a method and device for measurement report enhancement for aerial UE.

BACKGROUND

The following abbreviations are defined herewith, at least some of which are referred to in the following description: Third Generation Partnership Project ("3GPP"), Downlink ("DL"), Evolved Node B ("eNB"), Long Term Evolution ("LTE"), Radio Resource Control ("RRC"), Access Network ("AN"), Radio Access Network ("RAN"), User Entity/Equipment (Mobile Terminal) ("UE"), and Uplink ("UL").

There has been increasing interest in covering aerial vehicles such as drones with cellular networks. The use cases of commercial drones are growing very rapidly and include: package delivery, search-and-rescue, monitoring of critical infrastructure, wildlife conservation, flying cameras, and surveillance. All of these use cases could undergo rapid growth, and more will emerge in coming years. Many of these emerging use cases could benefit from connecting drones to the cellular network as a UE. LTE is well positioned to serve aerial vehicles such as drones. In fact, there have been an increasing number of field-trials involving the use of LTE networks to provide connectivity to drones. It is predicted that a rapid and vast growth in the drone industry will bring new promising business opportunities for LTE operators. To address this growing market demand, a new study item (SI) called "Study on Enhanced LTE Support for Aerial Vehicles" has been approved by 3GPP TSG RAN #75 [1]. The following enhancements were proposed:

Interference mitigation solutions for improving system-level performance in both UL and DL;

Solutions to detect whether a UL signal from an airborne UE increases interference in multiple neighboring cells and whether an airborne UE incurs interference from multiple cells;

Identification of an airborne UE that does not have proper certification for connecting to the cellular network while airborne;

Handover: Identify if enhancements of cell selection and handover efficiency, as well as robustness in handover signaling, can be achieved; and Positioning: If time allows a 2nd priority, assess the achievable accuracy with existing positioning techniques and identify potential enhancements.

REFERENCES

[1]. RP-170779, "New SID on Enhanced Support for Aerial Vehicles", NTT DOCOMO INC, Ericsson;

[2]. 3GPP TS 36.331, "Radio Resource Control (RRC) Protocol Specification";

[3]. R2-1708662, "Potential Enhancements for UAV Interference Problems", Ericsson;

[4]. R2-1709396, "Measurements Reporting Enhancements for UAV UE, NTT", DOCOMO INC.;

[5]. R2-1709038, "UL Interference From an Aerial Vehicle", Intel Corporation;

[6]. R2-1708545, "Measurement Report Mechanism for Drones", Huawei, HiSilicon; and

[7]. R2-1708973, "Consideration for Interference Detection and Measurement Enhancement for Drone UE", Lenovo, Motorola Mobility.

The above references are identified by the RAN group from the radio aspect. However, there exist other problematic issues which also need to be solved.

According to the RAN2 #98 online meeting agreement, it was agreed, in the interests of interference detection, to study the enhancement of measurement report mechanisms in order to address the issue of an increased number of strong neighboring cells.

During the RAN2 #99 meeting, several companies proposed solutions for measurement enhancement for the purpose of interference detection, which is summarized as the following:

1). Multi-cell trigger mechanism: when multiple-cell measurement results all fulfill the configured triggering threshold, the measurement report is triggered.

2). Multi-cell trigger mechanism with a timer for max measurement report delay: when multiple cell measurement results all fulfill the configured triggering threshold, the measurement report is triggered. If the measured cells did not fulfill the indicated multi-cell number, then after the timer is expired, the measurement is still triggered to be reported.

3). Specific TTT value: Use aerial specific TTT value with enlarged value compared with terrestrial UEs. And such enlarged TTT value can be used to await more measurement results, so that multiple measurement results can be reported in one measurement report.

However, all of the above mechanisms have disadvantages, for which the key problem may include the following: 1) the multi-cell trigger is not directly related to the total interference that the aerial UE suffers; 2) extra delays are introduced for the measurement report; and/or 3) additional delays will be always introduced, and this is not even considering the total interference from neighboring cells.

BRIEF SUMMARY

Methods and devices for measurement report enhancement for aerial UE are disclosed. A method of measurement report enhancement for aerial UE is disclosed.

In one embodiment, a method of measurement report enhancement, the method comprising: receiving a measurement report configuration with a corresponding threshold and condition configuration and possible new measurement triggering event from eNB; performing measurements of cells according to the new measurement triggering event or new trigger condition; evaluating whether a new triggering condition or the new measurement triggering event is satisfied with the threshold based on the measurement result of cells; and reporting the measurement report to the eNB upon the new triggering condition or new trigger event to be satisfied.

In one embodiment, wherein the measurement report configuration includes: a new measurement event name; a first threshold for determining whether the sum of measurement results of neighboring cells is satisfied; and/or a second threshold for determining whether each neighboring cell result is satisfied, and the number of measured neighboring cells results.

In one embodiment, the new triggering condition includes an (entering) condition 1, the (entering) condition 1 and a (entering) condition 2, or the combination of the (entering) condition 1 and the (entering) condition 2.

In one embodiment, wherein the (entering) condition 1 is that the sum of measurement results of neighboring cells is larger than the first threshold, based on the following formula:

$$Offset_1 \times 10 \log(\Sigma_{i=1}^{m}(Offset_{2i} \times P_{ni} + Offset_{3i})) + Offset_4 > ThreshRSRPSum,$$

Where $P_{ni}$ is the measurement results for ith measured neighboring cell, m is the total number of measured neighboring cells results, or m is the number of cells that fulfill the (entering) condition 2, or m represents the first m measurement results of neighboring cells in the measurement results list, ordered such that the best cell is listed first, and the value of m is configured by the higher layer, ThreshRSRPSum is the threshold for the sum of measurement results of measured neighboring cells, and is expressed in dBm, $Offset_1$ is a scaling factor which is configured by eNB for this event, $Offset_{2i}$ is a scaling factor which is configured by eNB for each measured neighboring cell i, $Offset_{3i}$ is an offset value configured by eNB for each measured neighboring cell, and $Offset_4$ is an offset value configured by eNB for this event. $P_{ni}$ and $Offset_{3i}$ are expressed in mW in case of RSRP; $Offset_4$ and ThreshRSRPSum are expressed in dBm in case of RSRP, or in dB in case of RSRQ and RS-SINR.

In one embodiment, the (entering) condition 2 is that the measurement result of the neighboring cell is better than a threshold based on the following formula:

$$Mn + Ofn + Ocn - Hys > Thresh$$

Where the variables in the formula are defined as follows: Mn is the measurement result of the neighboring cell, not taking into account any offsets; Ofn is the frequency specific offset of the frequency of the neighboring cell; Ocn is the cell specific offset of the neighboring cell; Hys is the hysteresis parameter for this event; Thresh is the threshold parameter for this event; Mn and Thresh are expressed in dBm in case of RSRP, or in dB in case of RSRQ and RS-SINR; Ofn, Ocn, Hys are expressed in dB.

A UE for measurement report enhancement, the UE comprising: a transceiver; a processor is configured to control the transceiver to: receiving a measurement report configuration with corresponding threshold and condition configuration and possible new measurement triggering event from eNB; performing measurements of a cells according to the new measurement triggering event or new trigger condition; evaluating whether a new triggering condition for the new measurement triggering event is satisfied with the threshold based on the measurement result of cells; and reporting the measurement report to the eNB when the new triggering condition or new trigger event is satisfied.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
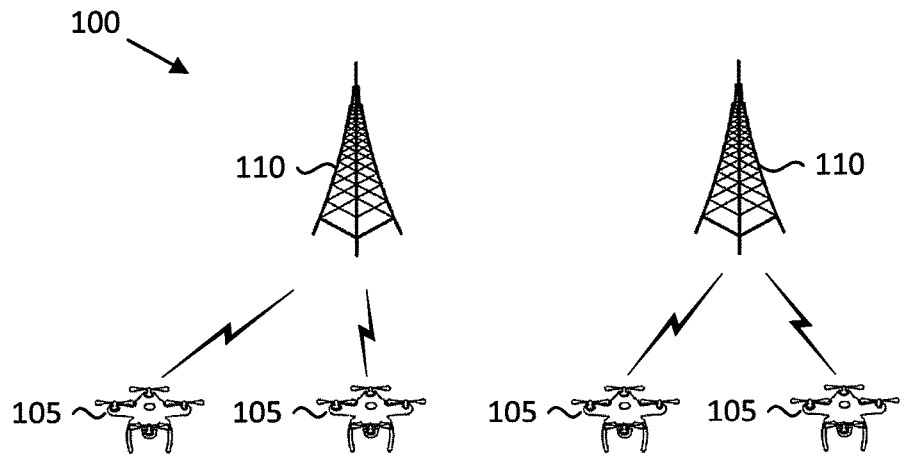
FIG. 1 is a schematic block diagram illustrating one embodiment of a wireless communication system.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, embodiments may take the form of a program product embodied in one or more computer readable storage devices storing machine readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled "modules", in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations, including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory ("RAM"), read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer, or entirely on the remote computer or server. In the lattermost scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding Figures. Like numbers refer to like elements in all Figures, including alternate embodiments of like elements.

FIG. 1 depicts an embodiment of a wireless communication system 100. In one embodiment, the wireless communication system 100 includes mobile units 105, and base units 110. Even though a specific number of mobile units 105 and base units 110 are depicted in FIG. 1, one skilled in the art will recognize that any number of mobile units 105 and base units 110 may be included in the wireless communication system 100.

In one embodiment, the mobile units 105 may include aerial vehicles such as drones or the like. Examples of use cases of drones include package delivery, search-and-rescue, monitoring of critical infrastructure, wildlife conservation, flying cameras, and surveillance. The mobile units 105 may be referred to as remote units, subscriber units, mobiles, mobile stations, users, terminals, mobile terminals, UEs, subscriber stations, user terminals, a device, or by other terminology used in the art. The mobile units 105 may communicate wirelessly with one or more of the base units 110.

The base units 110 may be distributed over a geographic region. In certain embodiments, a base unit 110 may also be referred to as an access point, an access terminal, a base, a base station, a Node-B, an eNB, a gNB, a Home Node-B, a relay node, a device, or by any other terminology used in the art.

In one implementation, the wireless communication system 100 is compliant with the LTE of the 3GPP protocol. More generally, however, the wireless communication system 100 may implement some other open or proprietary communication protocol. The present disclosure is not intended to be limited to the implementation of any particular wireless communication system architecture or protocol.

The base units 110 may serve a number of mobile units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain.

Figure 2:
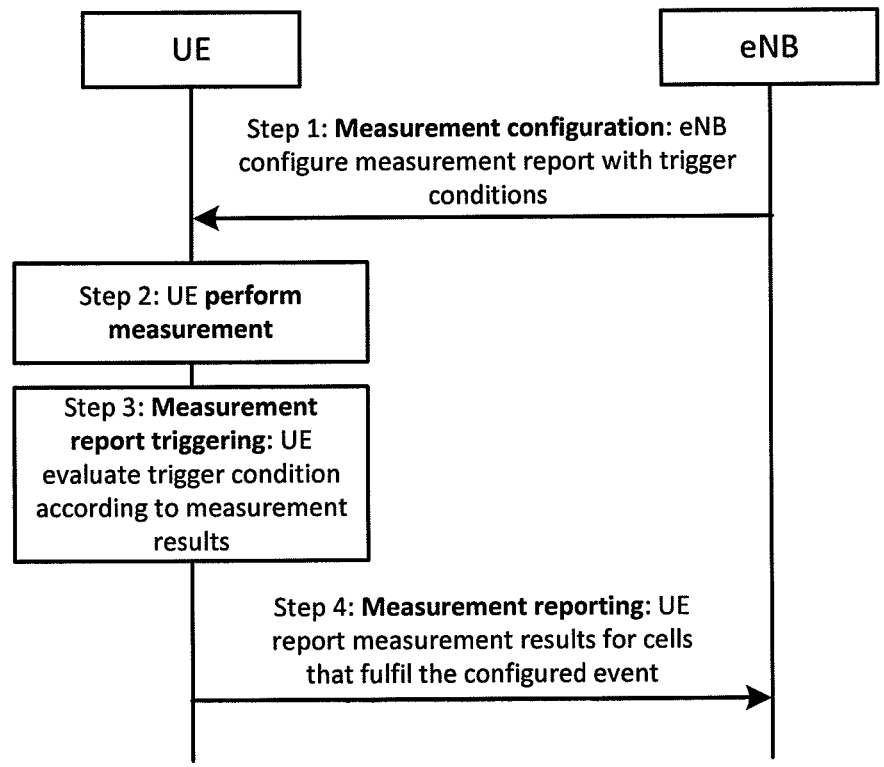
FIG. 2 is a schematic diagram illustrating an existing measurement procedure.

FIG. 2 is a schematic diagram illustrating an existing measurement procedure.

FIG. 2 depicts a method for an existing measurement procedure. As depicted in FIG. 2, the method for an existing measurement procedure includes steps 1-4:

Step 1 is the measurement configuration step, whereby eNB configures a measurement report with trigger conditions, and other measurement related configuration;

Step 2 is the UE performance measurement step, whereby UE performs the cell measurements based on the measurement configuration;

Step 3 is the measurement report triggering step, whereby the UE evaluates trigger conditions according to the cell measurements results, and when the cell measurements results satisfy the trigger conditions, step 3 proceeds to step 4; and Step 4 is the measurement reporting step, whereby the UE reports measurement reports for cells that fulfill the trigger conditions.

Figure 3:
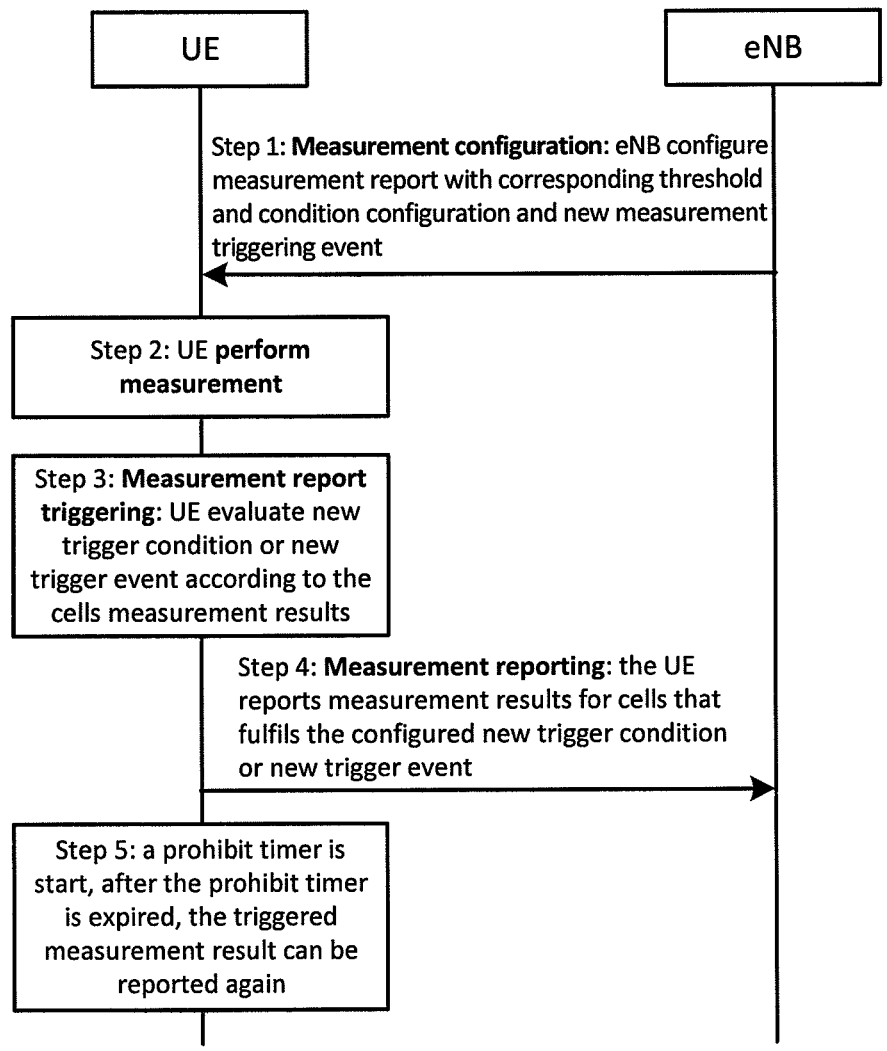
FIG. 3 is a schematic chart diagram illustrating new measurement procedure for measurement report enhancement.
Figure 4:
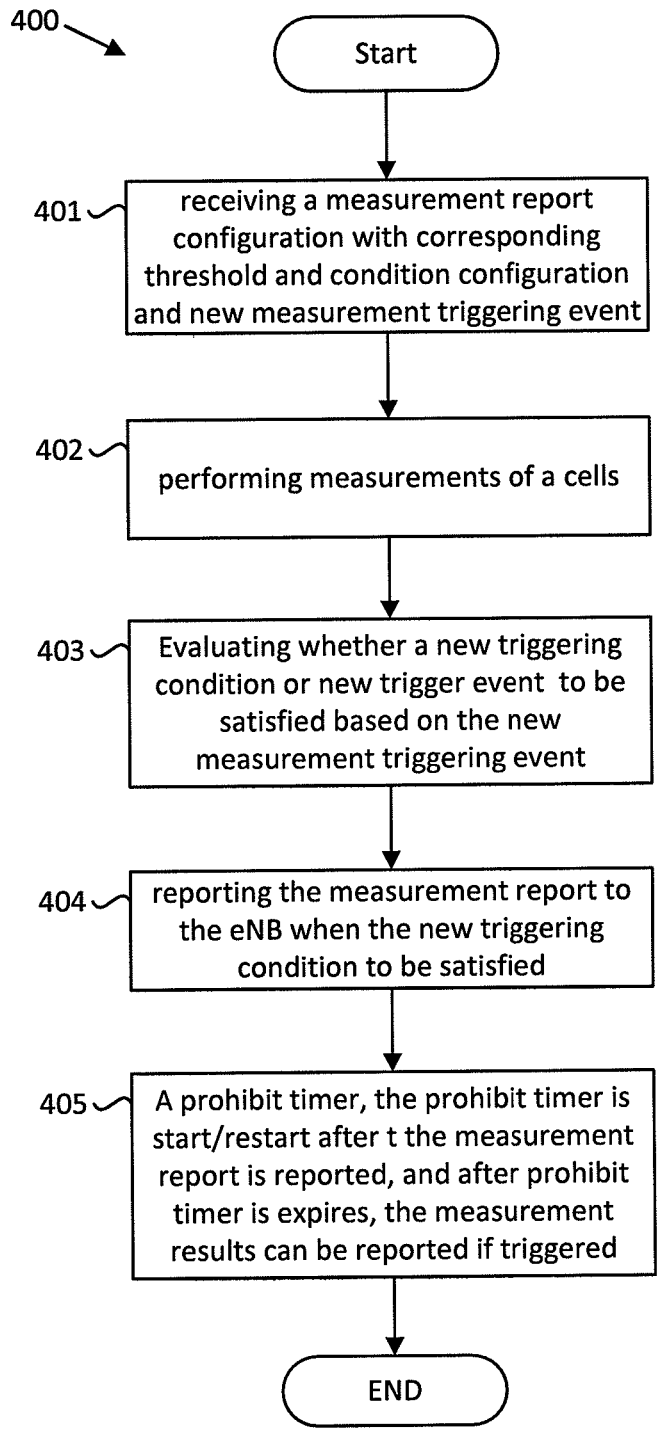
FIG. 4 is a schematic flow chart diagram illustrating a new measurement procedure for measurement report enhancement.

FIG. 3 is a schematic chart diagram illustrating a new measurement procedure for measurement report enhancement. FIG. 4 is a schematic flow chart diagram illustrating a new measurement procedure for measurement report enhancement.

FIGS. 3 and 4 depict a method for a new measurement procedure for measurement report enhancement. We will describe the new measurement procedure based on FIGS. 3 and 4.

As depicted in FIG. 3, the method for a new measurement procedure for measurement report enhancement includes steps 1-5.

Step 1 is the measurement configuration step, whereby eNB configures a measurement report with a corresponding threshold and condition configuration and new measurement triggering event;

Step 2 is the UE performance measurement step, whereby UE performs the cell measurements based on the new trigger measurement event or new trigger condition;

Step 3 is the measurement report triggering step, whereby the UE evaluates the new trigger condition or new trigger event according to the cell measurements results; and Step 4 is measurement reporting, whereby the UE reports measurement results for cells that fulfill the configured new trigger condition or new trigger event.

Preferably, the method for new measurement procedure for measurement report enhancement further includes step 5. In step 5, a prohibit timer is started to prevent the following measurement report. After the prohibit timer is expired, the trigger measurement result can be reported again.

As depicted in FIG. 4, the method for the new measurement procedure for measurement report enhancement includes steps 1-4 and/or 5.

In step 401, UE receives a measurement report configuration with the corresponding threshold and condition configuration and the new measurement triggering event from eNB;

In step 402, UE performs measurements of a cells;

In step 403, UE evaluates whether a new triggering condition or new trigger event is satisfied based on the new measurement result of cells; and In step 404, UE reports the measurement report to the eNB when the new triggering condition or new trigger event is satisfied.

Preferably, in FIG. 4, the method further includes running a prohibit timer, whereby the prohibit timer is started/restarted after the measurement report is reported, and after the prohibit timer is expires, the measurement results can be reported if triggered.

Figure 5:
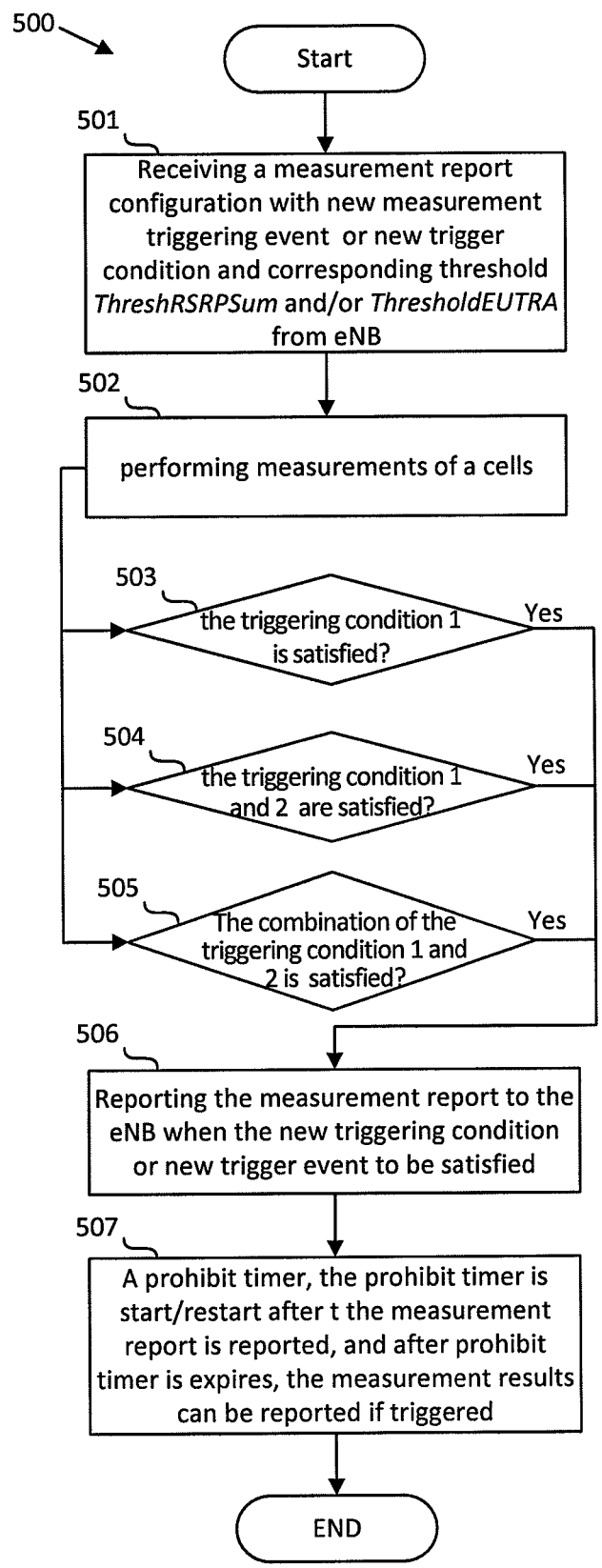
FIG. 5 is a schematic flow chart diagram illustrating one embodiment of a method for measurement report enhancement.

FIG. 5 is a schematic flow chart diagram illustrating one embodiment of a method for measurement report enhancement. As depicted in FIG. 5, the method for the new measurement procedure for the measurement report enhancement includes:

1. Step 501: Measurement configuration

In measurement configuration for report configuration, a new measurement triggering event or new trigger condition is configured, and the report configuration includes one or more elements in the following:

i. New event name, ii. New (event) threshold 1 for determining whether a sum of measurement results of neighboring cells, e.g. ThreshRSRPSum is satisfied;

iii. New (event) threshold 2 for determining whether each neighboring cell result, e.g. ThresholdEUTRA, is satisfied;

iv. The number of measured neighboring cell results used for determining whether the triggering condition is satisfied in the new measurement triggering event or new trigger condition, e.g. m; and v. Preferably, the method for the first embodiment further includes the prohibit timer, which is used to prevent frequent measurement reporting for interference detection purposes.

2. Step 502 is the UE performance measurement step, UE performs the cell measurements based on the new trigger measurement event or new trigger condition.

3. Measurement report triggering:

A new measurement triggering event or new trigger condition can be defined, that the UE shall consider the (entering) conditions for this new measurement triggering event to be satisfied when (entering) condition 1 is fulfilled, both (entering) condition 1 and 2 are fulfilled, or the combination of the (entering) conditions 1 and 2.

In step 503, (entering) condition 1: the sum of measurement results of neighboring cells larger than a configured threshold based on the following formula;

$$\text{Offset}_1 \times 10 \log(\Sigma_{i=1}^{m}(\text{Offset}_{2i} \times P_{ni} + \text{Offset}_{3i})) + \text{Offset}_4 > \text{ThreshRSRPSum}$$

The variables in the formula are defined as follows: $P_{ni}$ is the measurement results for ith measured neighboring cell, and such measurement result can be RSRP and expressed in mW; where m is the total number of measured neighboring cells results, or m is the number of neighboring cells whose results fulfill the Entering condition 2, or m represents the first m measurement results of neighboring cells in the measurement results list, which is ordered such that the best cell is listed first, and the value of m is configured by the higher layer; ThreshRSRPSum is the higher layer configured threshold value, which is used to determine whether the sum of measurement results of measured neighboring cells is still tolerant. ThreshRSRPSum is expressed in dBm; $\text{Offset}_1$ is a scaling factor which is configured by eNB for this event. The range of $\text{Offset}_1$ can be e.g. [0,1] or $\text{Offset}_1$ belongs to {0, 0.1, 0.2, 0.3, 0.4, 0.5, 0.6, 0.7, 0.8, 0.9, 1.0}. $\text{Offset}_1$ can exist or not exist in the above equation; $\text{Offset}_{2i}$ is a scaling factor which is configured by eNB for each measured neighboring cell i. The range of $\text{Offset}_{2i}$ can be e.g. [0,1] or $\text{Offset}_{2i}$ belongs to {0, 0.1, 0.2, 0.3, 0.4, 0.5, 0.6, 0.7, 0.8, 0.9, 1.0}. $\text{Offset}_{2i}$ can exist or not exist in the above equation; $\text{Offset}_{3i}$ is an offset value configured by eNB for each measured neighboring cell i. $\text{Offset}_{3i}$ can be the offset of frequency specific offset of the frequency of the neighboring cell i, or the cell specific offset of the neighboring cell i, or the hysteresis parameter for this event. $\text{Offset}_{3i}$ can exist or not exist in the above equation; $\text{Offset}_4$ is an offset value configured by eNB for this event. $\text{Offset}_4$ can be the offset of frequency specific offset of the measuring frequency, or the hysteresis parameter for this event. $\text{Offset}_4$ can exist or not exist in the above equation. $P_{ni}$ and $\text{Offset}_{3i}$ are expressed in mW in case of RSRP; $\text{Offset}_4$ and ThreshRSRPSum are expressed in dBm in case of RSRP, or in dB in case of RSRQ and RS-SINR.

Further, the UE shall consider the leaving condition for this new measurement triggering event to be satisfied when leaving condition 1 is fulfilled;

Leaving condition 1: the sum of measurement results of neighboring cells is smaller than a higher layer configured threshold $$\text{Offset}_1 \times 10 \log(\Sigma_{i=1}^{m}(\text{Offset}_{2i} \times P_{ni} + \text{Offset}_{3i})) + \text{Offset}_4 < \text{ThreshRSRPSum}$$

In step 504, the UE shall consider the entering condition 2 which is defined as follows;

Entering condition 2: neighboring cell results are better than a threshold based on the following formula:

$$Mn + Ofn + Ocn - Hys > \text{Thresh}$$

The variables in the above formula are defined as follows: Mn is the measurement result of the neighboring cell, not taking into account any offsets; Ofn is the frequency specific offset of the frequency of the neighboring cell (i.e. offsetFreq as defined within measObjectEUTRA, corresponding to the frequency of the neighboring cell); Ocn is the cell specific offset of the neighboring cell (i.e. cellIndividualOffset as defined within measObjectEUTRA corresponding to the frequency of the neighboring cell), and set to zero if not configured for the neighboring cell; Hys is the hysteresis parameter for this event (i.e. hysteresis as defined within reportConfigEUTRA for this event); Thresh is the threshold parameter for this event (i.e. a4-Threshold as defined within reportConfigEUTRA for this event); Mn is expressed in dBm in case of RSRP, or in dB in case of RSRQ and RS-SINR; Ofn, Ocn, Hys are expressed in dB; and Thresh is expressed in the same unit as Mn.

Further, in step 505, the entering condition 1 and entering condition 2 can be combined as one condition, which is as follows. The description of each parameter is the same as in steps 503 and 504:

$$\text{Offset}_1 \times 10 \log\left(\sum_{i=1}^{m}(\text{Offset}_{2i} \times P_{ni} + \text{Offset}_{3i})\right) + \text{Offset}_4 > \text{ThreshRSRPSum}$$

a) In which $10 \log P_{ni} + Ofn + Ocn - Hys > \text{Thresh}$

Step 506 is measurement reporting, the UE reports measurement results for cells that satisfied the above (trigger) condition, based on the configured new trigger measurement event or new trigger condition.

Preferably, the method for the first embodiment further includes step 507. In step 507, a prohibit timer is started to prevent the following measurement report. After the prohibit timer is expired, the trigger measurement result can be reported again.

The prohibit timer is configured by a higher layer, and is started/restarted after the measurement result is reported. During the running of the prohibit timer, all measurement results that used interference detection for aerial UE will not be reported even if the report is triggered, and the triggered measurement report will be stored until the prohibit timer expires, or, if the triggered measurement report is abandoned while the prohibit timer is running, and after prohibit timer is expires, the measurement results can be reported if triggered.

Figure 6:
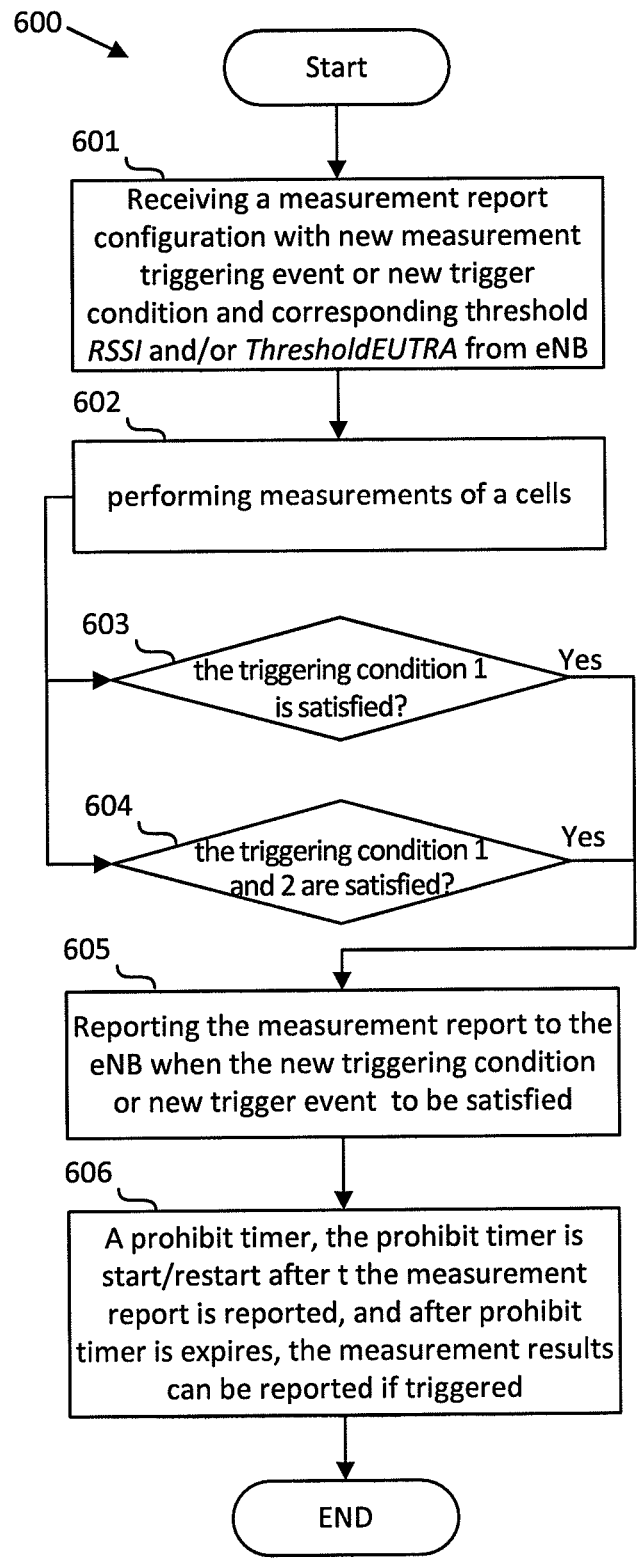
FIG. 6 is a schematic flow chart diagram illustrating another embodiment of a method for measurement report enhancement.

FIG. 6 is a schematic flow chart diagram illustrating the second embodiment of a method for measurement report enhancement. As depicted in FIG. 6, the method for the new measurement procedure for measurement report enhancement includes:

Step 601: Measurement configuration

In the measurement configuration for report configuration, a new measurement triggering event or a new trigger condition is configured, and the report configuration includes one or more elements in the following:

i. New event name, ii. New (event) threshold 1 for determining whether the RSSI of UE fulfils the triggering condition or trigger event, that is, the threshold configured by higher layer.

iii. New (event) threshold 2 for determining whether each neighboring cell result, e.g. ThresholdEUTRA, is satisfied;

iv. Preferably, the method for the second embodiment further includes the prohibit timer, which is used to prevent frequent measurement reporting for interference detection purposes.

2. Step 602 is the UE performance measurement step, where the UE performs the cell measurements based on the new trigger measurement event or new trigger condition.

3. Measurement report triggering:

A new measurement triggering event or new trigger condition is defined, such that the UE shall consider the (entering) condition for this new measurement triggering event or new trigger condition to be satisfied when (entering) condition 1 is fulfilled, or when both (entering) condition 1 and 2 are fulfilled.

In step 603, (entering) condition 1: the RSSI is larger than a threshold that configured by higher layer based on the following formula:

$$RSSI > Thresh$$

The variables in the formula are defined as follows: RSSI is the measured E-UTRA Received Signal Strength Indicator (RSSI) by the UE, Thresh is the higher layer configured threshold value, which is used to determine whether the RSSI fulfils the condition.

Further, the UE shall consider the leaving condition for this new measurement triggering event to be satisfied when the leaving condition is fulfilled.

Leaving condition: the RSSI is smaller than a threshold configured by the higher layer based on the following formula:

$$RSSI > Thresh$$

In step 604, the UE shall consider the entering condition 2 which is defined as follows.

The entering condition 2: neighboring cell results are better than a threshold based on the following formula:

$$Mn + Ofn + Ocn - Hys > Thresh$$

The variables in the formula are defined as follows: Mn is the measurement result of the neighboring cell, not taking into account any offsets; Ofn is the frequency specific offset of the frequency of the neighboring cell (i.e. offsetFreq as defined within measObjectEUTRA and corresponding to the frequency of the neighboring cell); Ocn is the cell specific offsetting of the neighboring cell (i.e. cellIndividualOffset as defined within measObjectEUTRA and corresponding to the frequency of the neighboring cell), and set to zero if not configured for the neighboring cell; Hys is the hysteresis parameter for this event (i.e. hysteresis as defined within reportConfigEUTRA for this event); Thresh is the threshold parameter for this event (i.e. a4-Threshold as defined within reportConfigEUTRA for this event); Mn is expressed in dBm in case of RSRP, or in dB in case of RSRQ and RS-SINR; Ofn, Ocn, and Hys are expressed in dB; and Thresh is expressed in the same unit as Mn.

Step 605 is measurement reporting, the UE reports measurement results for cells that satisfied the above trigger condition based on the configured new trigger measurement event or new trigger condition.

Preferably, the method for the first embodiment further includes step 606. In step 606, a running prohibit timer is started to prevent following the measurement report. After the running prohibit timer has expired, the trigger measurement result can be reported again.

The prohibit timer is configured by the higher layer; and

The prohibit timer is configured by the higher layer, the prohibit timer is started/restarted after the measurement result is reported. During the running of the prohibit timer, all measurement results used for interference detection for aerial UE will not be reported even if the report is triggered, and the triggered measurement report will be stored until the prohibit timer expires, or, the triggered measurement report is abandoned while the prohibit timer is still running, and after prohibit timer expires, the measurement results can be reported if triggered.

Figure 7:
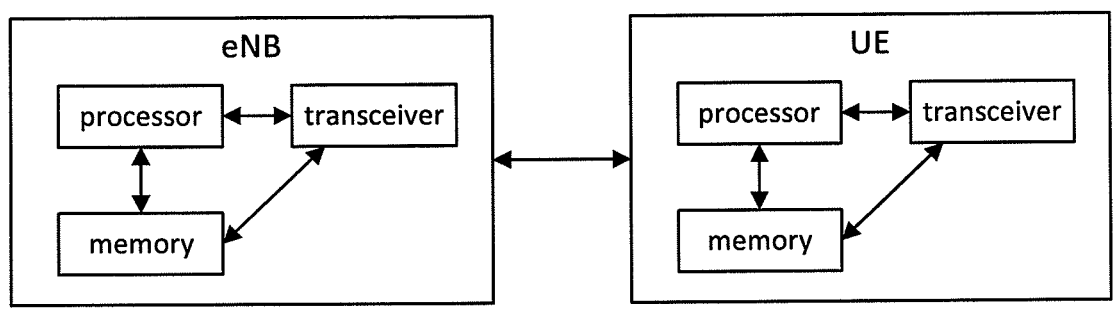
FIG. 7 is a schematic block diagram illustrating a wireless communication system.

FIG. 7 illustrates a block diagram of a wireless communication apparatus according to the first and the second embodiments.

Referring to FIG. 7, a wireless communication system includes a eNB and multiple UEs positioned within an area of the eNB.

The eNB includes a processor, a memory, and a transceiver. The processor implements a function, a process, and/or a method which are proposed in FIGS. 2 to 6 above. Layers of a radio interface protocol may be implemented by the processor. The memory is connected with the processor to store various pieces of information for driving the processor. The transceiver is connected with the processor to transmit and/or receive a radio signal.

The UE includes a processor, a memory, and a transceiver. The processor implements a function, a process, and/or a method which are proposed in FIGS. 2 to 6 above. Layers of a radio interface protocol may be implemented by the processor. The memory is connected with the processor to store various pieces of information for driving the processor. The transceiver is connected with the processor to transmit and/or receive a radio signal.

The memories may be positioned inside or outside the processors and connected with the processors by various well-known means. Further, the eNB and/or the UE may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment may be implemented in the form of a module, a procedure, a function, and the like to perform the functions or operations described above. A software code may be stored in the memory and executed by the processor. The memory may be positioned inside or outside the processor and may transmit and receive data to/from the processor by various means.

The invention claimed is:

1. A method of measurement report enhancement, the method comprising:

receiving a measurement report configuration with a new triggering condition and
a corresponding threshold from an evolved Node B ("eNB"), wherein:
the new triggering condition comprises a condition 1 or the condition 1 and a condition 2;
the condition 1 comprises:
a sum of measurement results of neighboring cells being larger than a first threshold; and
the condition 2 comprises a measurement result of a neighboring cell being larger than a second threshold;
performing measurements of a cells according to the new triggering condition;
evaluating whether the new triggering condition is satisfied with the threshold based on the measurement result of cells; and
reporting the measurement report to the eNB in response to the new triggering condition being satisfied.

2. The method of claim 1, wherein the measurement report configuration includes:
a new measurement report trigger condition configuration;
the first threshold for determining whether a sum of measurement results of neighboring cells is satisfied; and/or the second threshold for determining whether each neighboring cell result is satisfied; and
a number of measured neighboring cells results.

3. The method of claim 2, wherein the measurement report configuration further includes a prohibit timer.

4. The method of claim 3, wherein the method further comprising:
the prohibit timer is started/restarted after the measurement report is reported;
during the running of the prohibit timer, all of the measurement reports will not be reported even if the report is triggered;
the triggered measurement report will be stored until the prohibit timer expires, or the triggered measurement report is abandoned while the prohibit timer is running, and
after the prohibit timer expires, the measurement results can be reported if triggered.

5. The method of claim 1, wherein the sum of measurement results of the neighboring cells being larger than the first threshold is based on the following formula:

$$Offset_1 \times 10\log\left(\sum_{i=1}^{m} (Offset_{2i} \times P_{ni} + Offset_{3i})\right) + Offset_4 > ThreshRSRPSum$$

wherein $P_{ni}$ is the measurement results for ith measured neighboring cell, m is the total number of measured neighboring cells results, or m represents the first m measurement results of neighboring cells in the measurement results list, which is ordered such that the best cell is listed first, and the value of m is configured by a higher layer, ThreshRSRPSum is the threshold for sum of measurement results of measured neighboring cells, $Offset_1$ is a scaling factor which is configured by eNB for this event, $Offset_{2i}$ is a scaling factor which is configured by eNB for each measured neighboring cell i, $Offset_{3i}$ is an offset value that configured by eNB for each measured neighboring cell i, and $Offset_4$ is an offset value that configured by eNB for this event, and $Offset_{3i}$ are expressed in mW in case of RSRP; $Offset_4$ and ThreshRSRPSum is expressed in dBm in case of RSRP, or in dB in case of RSRQ and RS-SINR.

6. The method of claim 5, wherein the measurement result of the neighboring cell being larger than the second threshold is based on the following formula:

$$Mn + Ofn + Ocn - Hys > Thresh$$

wherein the variables in the formula are defined as follows: Mn is the measurement result of the neighboring cell, not taking into account any offsets; Ofn is the frequency specific offset of the frequency of the neighboring cell; Ocn is the cell specific offsetting of the neighboring cell; Hys is the hysteresis parameter for this event; Thresh is the threshold parameter for this event; Mn and Thresh are expressed in dBm in case of RSRP, or in dB in case of RSRQ and RS-SINR; Ofn, Ocn, Hys are expressed in dB.

7. The method of claim 6, wherein the combination of the condition 1 and the condition 2 is based on the following formula:

$$Offset_1 \times 10\log\left(\sum_{i=1}^{m} (Offset_{2i} \times P_{ni} + Offset_{3i})\right) + Offset_4 > ThreshRSRPSum$$

in which $10\log P_m + Ofn + Ocn - Hys > Thresh$.

8. The method of claim 5, wherein the new triggering condition further includes a leaving condition, which is that the sum of measurement results of neighboring cells is smaller than the first event threshold based on the following formula:

$$Offset_1 + 10 \log(\Sigma_{i=1}{}^m Offset_{2i} \times P_{ni} + Offset_{3i}) + Offset_4 > ThreshRSRPSum.$$

9. The method of claim 1, wherein the measurement report configuration includes:
a new measurement report trigger condition configuration; and/or
a second threshold for determining if each neighboring cell result is satisfied.

10. The method of claim 9, wherein the measurement report configuration further includes a prohibit timer.

11. The method of claim 10, wherein the method further comprises:
the prohibit timer is started/restarted after the measurement report is reported;
during the running of prohibit timer, all of the measurement results will not be reported even if the measurement report is triggered;
the triggered measurement report will be stored until the prohibit timer expires, or the triggered measurement report is abandoned while the prohibit timer is running, and
after the prohibit timer expires, the measurement report can be reported if triggered.

12. The method of claim 1, wherein the received signal strength indictor being larger than the third threshold is based on the following formula:

$$RSSI > Thresh$$

wherein the RSSI is the measured RSSI by the UE, and Thresh is a higher layer configured threshold value, RSSI and Thresh are expressed in dBm.

13. The method of claim 12, wherein the new triggering condition further includes a leaving condition, which is that the measurement result of the neighboring cell is worse than a threshold based on the following formula:

$$Mn+Ofn+Ocn-Hys>Thresh$$

wherein the variables in the formula are defined as follows: Mn is the measurement result of the neighboring cell, not taking into account any offsets; Ofn is the frequency specific offsetting of the frequency of the neighboring cell; Ocn is the cell specific offsetting of the neighboring cell; Hys is the hysteresis parameter for this event; Thresh is the threshold parameter for this event; Mn and Thresh are expressed in dBm in case of RSRP, or in dB in case of RSRQ and RS-SINR; Ofn, Ocn, Hys are expressed in dB.

14. The method of claim 1, wherein the measurement result of the neighboring cell being larger than the second threshold is based on the following formula:

$$Mn+Ofn+Ocn-Hys>Thresh$$

wherein the variables in the formula are defined as follows: Mn is the measurement result of the neighboring cell, not taking into account any offsets; Ofn is the frequency specific offsetting of the frequency of the neighboring cell; Ocn is the cell specific offsetting of the neighboring cell; Hys is the hysteresis parameter for this event; Thresh is the threshold parameter for this event; and Thresh are expressed in dBm in case of RSRP, or in dB in case of RSRQ and RS-SINR; Ofn, Ocn, Hys are expressed in dB.

15. A user equipment ("UE") for measurement report enhancement, the UE comprising:

a transceiver;
a processor configured to control the transceiver to:
receive a measurement report configuration with a new triggering condition and corresponding threshold from an evolved Node B ("eNB"), wherein:
the new triggering condition comprises a condition 1 or the condition 1 and a condition 2;
the condition 1 comprises:
a sum of measurement results of neighboring cells being larger than a first threshold; and
the condition 2 comprises a measurement result of a neighboring cell being larger than a second threshold;
perform measurements of a cells according to the new triggering condition;
evaluate whether the new triggering condition is satisfied with the threshold based on the measurement result of cells; and
report the measurement report to the eNB in response to the new triggering condition being satisfied.

16. The UE of claim 15, wherein the measurement report configuration includes:
a new measurement report trigger condition configuration;
the first threshold for determining whether the sum of measurement results of neighboring cells is satisfied; and/or the second threshold for determining whether each neighboring cell result is satisfied; and
a number of the measured neighboring cells results.

* * * * *